United States Patent Office 2,857,385
Patented Oct. 21, 1958

2,857,385
PREPARATION OF PENTACYCLIC LACTONES

Martin Eric Kuehne, Summit, N. J., assignor to Ciba Pharmaceutical Products, Inc., Summit, N. J., a corporation of New Jersey No Drawing. Application April 17, 1956
Serial No. 578,595

2 Claims. (Cl. 260—286)

This application relates to a new process for the preparation of reserpine and compounds similar thereto, their optical antipodes and the racemates thereof, as well as their salts.

More particularly the invention relates to a process for the preparation of compounds of the following formula:

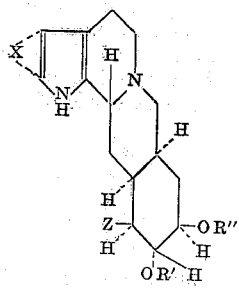

wherein X represents the unsubstituted or substituted remainder of a benzene nucleus, Z stands for —COOR or CH₂OH, R is hydrogen or lower alkyl, R' stands for lower alkyl and R" represents hydrogen or an acyl radical. The substituents of the benzene nucleus may be for example halogen atoms, e. g. chlorine, bromine or fluorine; lower alkyl, e. g. methyl or ethyl; or preferably lower alkoxy, e. g. methoxy, ethoxy or methylenedioxy. These substituents are advantageously in 10- and/or 11-position of the reserpine ring skeleton, preferably in 11-position. R and R', if alkyl radicals, are especially methyl or ethyl. An acyl radical is for example the radical of an aromatic, aliphatic, heterocyclic or aliphatic carboxylic or sulfonic acid, such as a lower fatty acid, e. g. acetic acid or propionic acid; phenyl carboxylic acids such as alkoxyphenyl carboxylic acids, e. g. 4-methoxy benzoic acid, 3,4-dimethoxybenzoic acid, 3,4,5-trimethoxybenzoic acid, 3,4-methylenedioxybenzoic acid, 3,4-diethoxybenzoic acid, syringic acid or O-carbalkoxy-syringic acids; alkoxyphenyl aliphatic carboxylic acids, e. g. alkoxy-cinnamic acids such as di- or trimethyl-cinnamic acid; monocyclic heterocyclic carboxylic acids, e. g. furane carboxylic acids such as furane-2-carboxylic acid, pyridine carboxylic acids such as nicotinic or isonicotinic acid, thiophene carboxylic acids such as thiophene-2-carboxylic acid; or arylsulfonic acids such as benzenesulfonic acid or p-toluenesulfonic acid.

These compounds may be laevo-rotary, dextro-rotary or racemates. The dextro-rotary compounds and racemates as well as the compounds of the above-mentioned formula, wherein X, Z and R" have the meaning given above and R' represents a lower alkyl group having at least two carbon atoms, or wherein Z, R' and R" have the meaning given below the first formula and X represents the substituted remainder of a benzene nucleus other than that in reserpine are described in my copending application Serial No. 576,833, filed April 9, 1956, now abandoned. The compounds obtained according to the new process, laevo-rotary, dextro-rotary and racemic, in which R and R" are alkyl and acyl groups respectively, have valuable pharmacological activity. They show a hypotensive and sedative activity and can be used as medicaments for the treatment of anxiety, nervousness, tension and mental disorders. Especially valuable in this respect are the compounds of the following formula:

wherein Y stands for hydrogen or methoxy, R and R' stand for methyl or ethyl and R" represents the acetyl, 4 - methoxybenzoyl, 3,4 - dimethoxybenzoyl, 3,4,5 - trimethoxybenzoyl, 3,4-methylenedioxybenzoyl, cinnamoyl, 4-methoxy-cinnamoyl, 3,4-dimethoxy-cinnamoyl or 3,4,5-trimethoxy-cinnamoyl, furoyl-2, nicotinoyl, or O-carbethoxy syringoyl radical. The other compounds of the general formula indicated in the beginning are intermediates for the preparation of the pharmacologically active compounds into which they can be converted according to known methods, which are exemplified on the laevo-rotary compounds in copending application Serial No. 526,780, filed August 5, 1955, by E. Schlittler et al., now Patent Number 2,824,874.

The new process of my invention consists in converting a compound of the formula:

wherein X and R' have the meaning given above, or salts thereof into a compound of the formula:

or salts thereof, by treatment with a dehydrating agent and, if desired, converting the lactone thus obtained into a compound of the general formula

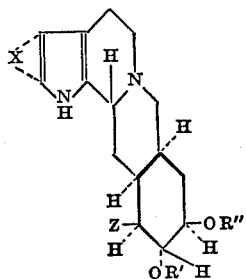

wherein X, Z, R' and R" have the aforesaid meanings, or salts thereof, by methods known per se.

Salts are more especially acid addition salts such as those with inorganic acids, for example, hydrohalic acids, e. g. hydrochloric acid; sulfuric acid, phosphoric acids, nitric acid or organic acids, for example, acetic acid. Salts of free carboxylic acid compounds are preferably alkali or alkaline earth metal salts.

Dehydrating agents which bring about isomerization at carbon atom 3 and the formation of the lactone are preferably those derived from inorganic or organic acids. More especially, anhydrides of inorganic acids, e. g. phosphorous pentoxide, polyphosphoric acid, or anhydrides of organic acids such as acetic anhydride, or acid chlorides such as acid chlorides of inorganic acids, e. g. phosphorus oxychloride, thionylchloride are used in the process of my invention. Preferably these dehydrating agents are used in the presence of a Lewis acid such as inorganic acids, for example, sulfuric acid, hydrohalic acids, e. g. hydrogen chloride, or organic acids, e. g. acetic acid, p-toluene sulfonic acid, or borontrifluoride.

In the compounds obtained the hydrogen in the 3-position has the same stereospecific configuration as the lactone grouping. Thus, the over-all configuration of the nucleus is the same as in the epi-alloyohimbine series, e. g. as in reserpine. The splitting of the lactone grouping is performed with hydrolyzing or alcoholyzing agents such as alkali or earth alkaline metal hydroxides, carbonates, lower alcoholates or amines.

In the compounds obtained, free carboxyl groups may be converted into lower carbalkoxy groups in the usual manner, for example, by treatment with lower diazoalkanes or lower alkanols in the presence of esterification catalysts. Esterified carboxyl groups may be hydrolyzed, for example, by treatment with alkaline agents, e. g. alkali metal hydroxides in lower alkanols. Free hydroxyl groups can be esterified in the usual way, preferably by reaction with acid halides, e. g. chlorides, or anhydrides. Amide groups can be converted into free or esterified carboxyl groups in the usual way. These subsequent reactions can be combined in any appropriate way and allowed to vary the final product of the process according to the formula given in the beginning.

The reaction may be carried out in the absence or presence of a solvent at room temperature or with heating in an open vessel or under pressure, preferably in an atmosphere of nitrogen.

The starting material can be used in the form of the optically active antipodes or the racemate. Racemates obtained in any stage of the process can be resolved to the optically active antipodes and may be used in either form for the remaining steps. Final compounds, if racemates, may also be resolved. The usual method for resolving is used, e. g. the reaction of the racemate with an optically active base or acid, as the case may be, and separating the diastereoisomeric compounds by fractional crystallization, and setting free the desired optically active compound.

The starting materials used in the process of the invention are known or can be made by known methods.

They can be obtained, for example, by total synthesis in the following manner: quinone is reacted with 1,4-butadiene-1-carboxylic acid in a Diels-Alder addition. The 6,9-dioxo-1,4,5α,6,9,10α-hexahydronaphthalene - 1β-carboxylic acid of the formula:

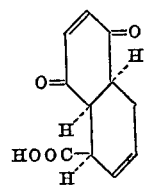

is then reduced with sodium borohydride to 6β-hydroxy-9 - oxo - 1,4,5α,6,9,10α - hexahydronaphthalene - 1β - carboxylic acid yielding by oxidation with perbenzoic acid, 2,3α - oxido - 6β - hydroxy - 9 - oxo - 1,2,3,4,5α,6,9,10α-octahydronaphthalene-1β-carboxylic acid of the formula:

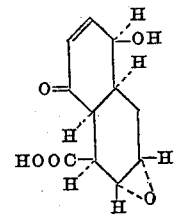

This compound, after esterification with diazomethane is subjected to a Meerwein-Ponndorf reduction with aluminum isopropoxide to yield the (1β→9β)-lactone of 3,6β - oxido - 9β - hydroxy - 3,4,5α,6,9,10α - hexahydronaphthalene - 1β - carboxylic acid of the formula:

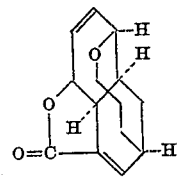

which by addition of a lower alkanol to the double bond in 1-position is converted into a (1β→9β)-lactone of 2α-lower alkoxy-3,6β-oxido-9β-hydroxy - 1,2,3,4,5α,6,9,10α-octahydronaphthalene-1β-carboxylic acid. Addition of bromohydrine to the double bond in 7-position results in the (1β→9β)-lactone of 2α-lower alkoxy-3,6β-oxido-7α-bromo-8β, 9β-dihydroxy-1,2,3,4,5α,6,7,8,9,10α-decahydronaphthalene-1β-carboxylic acid. Oxidation with chromic acid to the corresponding 8-oxo-compound, followed by reduction with zinc and acetic acid yields 2α-lower alkoxy - 3β - hydroxy - 8 - oxo - 1,2,3,4,5α,8,9,10α-octahydronaphthalene-1β-carboxylic acid of the formula:

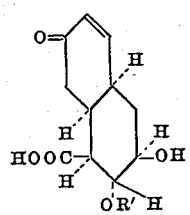

Esterification with diazomethane, acetylation with acetic acid anhydride in pyridine, oxidation with osmium tetroxide and oxidative degradation with periodic acid gives 2α-lower alkoxy 3β-acetoxy-5β-aldehydo-6β-carboxy methyl-cyclohexane-1β-carboxylic acid methyl ester. This after esterification with diazomethane is condensed with a tryptamine of the formula:

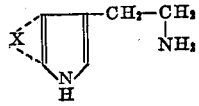

wherein X has the aforesaid meaning to yield a compound of the formula:

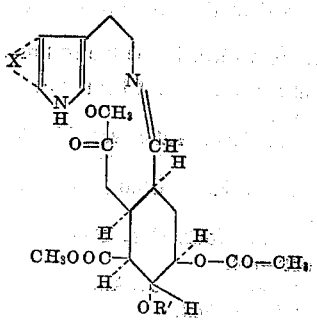

Reduction with sodium borohydride and ring closure with heating results in a compound of the formula:

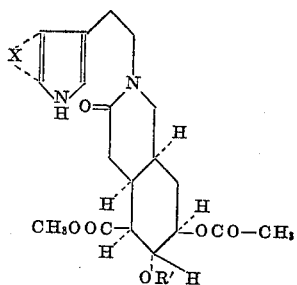

By treatment of the latter with phosphorus oxychloride, ring closure occurs to form compounds of the formula:

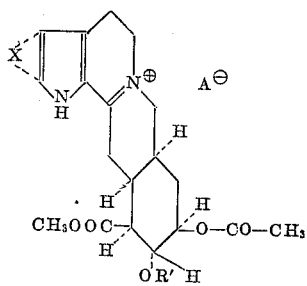

wherein A represents an anion, e. g. a chloride ion, which compounds can be reduced by treatment with hydrogen in statu nascendi, e. g. by treatment with sodium borohydride to compounds of the general formula:

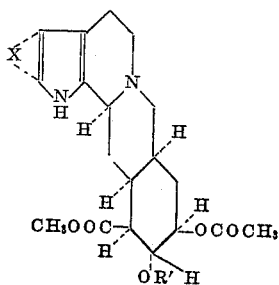

which may be converted into the desired starting material by methods known per se, for example, by hydrolysis in alkaline medium.

According to the conditions used in the reaction the products may be obtained free or in the form of their salts. Thus, bases obtained are converted into the salts in the customary manner, and the free bases can be obtained as usual from the salts. As salts especially acid addition salts are contemplated, e. g. those of the hydrohalic acids, e. g. hydrochloric acid; nitric acid, sulfuric acid, phosphoric acids, perchloric acid; acetic, citric, oxalic, tartaric, ascorbic, methane sulfonic, hydroxyethane sulfonic, p-toluene sulfonic acid or salicylic, p-amino-salicylic acid or acetyl-salicylic. Free carboxylic acid compounds can be in the form of their metal salts, e. g. alkali or alkaline earth metal salts.

The invention comprises also any process, wherein an intermediate obtainable at any stage of the process is used as starting material and the remaining steps are carried out.

The example which follows is given in the way of illustration and shall not be construed as a limitation. Many modifications will appear obvious to the man skilled in the art and it is intended that such obvious modifications are also comprised by my invention. Temperatures are given in degrees centigrade.

*Example*

0.5 g. of 3-isoreserpic acid hydrochloride is heated during 50 minutes in 25 ml. of acetic anhydride containing two drops of acetic acid in an atmosphere of nitrogen. The acetic anhydride and acetic acid is removed under reduced pressure and the residual material taken up in 100 ml. of water containing 3 ml. of hydrochloric acid. After extractions with 20 ml. portions of chloroform, the aqueous solution is made basic (pH 8) with aqueous ammonia. Extraction with 6 portions of 20 ml. each of chloroform and evaporation of the chloroform under reduced pressure yields reserpic acid lactone, M. P. 310–315°. The product is identified by mixed melting point and infrared spectrum as being identical with reserpic acid lactone obtained from reserpine.

The 3-iso-reserpic acid hydrochloride used as starting material in the above example is obtained as follows:

1 g. of methyl 3-iso-reserpate is refluxed for three and one-half hours in 60 ml. of methanol containing 4 g. of potassium hydroxide in an atmosphere of nitrogen. The methanol is removed under reduced pressure, 50 ml. of water are added and the solution is extracted four times with 20 ml. portions of chloroform. The water is removed under reduced pressure, the residual potassium hydroxide and potassium salt of 3-iso-reserpic acid is taken up in 60 ml. of methanol and acidified to pH2 with 7 N hydrochloric acid. Potassium chloride is removed by filtration, the residue washed with 100 ml. of a mixture (4:1) of chloroform:methanol. The combined organic solutions are evaporated to dryness under reduced pressure. By addition of 30 ml. of a mixture (4:3) of chloroform:methanol and by chilling in ice the crystallized hydrochloride of 3-iso-reserpic acid of the M. P. 267–269° (with decomposition) is obtained which is isolated by filtration.

What is claimed is:

1. Process for the preparation of a member of the group consisting of a compound of the formula:

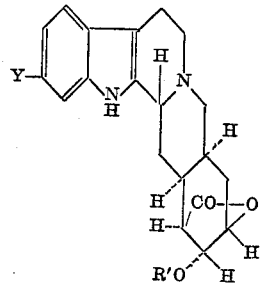

in which Y stands for a member of the group consisting of hydrogen and methoxy, and R' represents lower alkyl, and an acid addition salt thereof, which comprises treating a member of the group consisting of a compound of the formula:

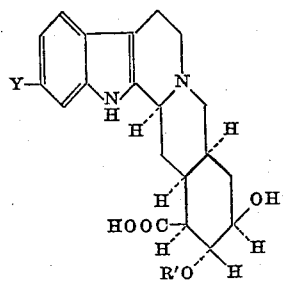

in which Y and R' have the above-given meaning, and an acid addition salt thereof, with a dehydrating agent selected from the group consisting of phosphorus pentoxide, acetic anhydride, phosphorus oxychloride and thionyl chloride, in the presence of a Lewis acid.

2. Process according to claim 1, wherein acetic acid anhydride is used in the presence of acetic acid.

References Cited in the file of this patent

Bader et al.: Jour. Am. Chem. Soc., vol. 77, 1955 pages 3547–3554.

Huebner et al.: Experientia, vol. 11, 1955, pages 303–304.

Dorfman et al.: Helv. Chim. Acta, vol. 37 (1954), pages 59–75.

Hosansky et al.: Jour. Am. Pharm. Assoc., vol. 44, 1954, pages 639–644.

MacPhillamy et al.: Jour. Am. Chem. Soc., vol. 77 (1955), pages 4335–4343.